US012674990B2

(12) United States Patent
Clement

(10) Patent No.: US 12,674,990 B2
(45) Date of Patent: Jul. 7, 2026

(54) ELECTRONIC DEVICE THAT PRESENTS GUIDED MEDITATION SESSIONS

(71) Applicant: Apple Inc., Cupertino, CA (US)

(72) Inventor: Manuel C Clement, Felton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/272,892

(22) Filed: Jul. 17, 2025

(65) Prior Publication Data

US 2026/0063905 A1 Mar. 5, 2026

Related U.S. Application Data

(60) Provisional application No. 63/688,679, filed on Aug. 29, 2024.

(51) Int. Cl.
| | |
|---|---|
| *G02B 27/01* | (2006.01) |
| *G02B 27/00* | (2006.01) |
| *G06F 3/01* | (2006.01) |
| *G06F 3/16* | (2006.01) |
| *G06V 10/82* | (2022.01) |
| *G06V 20/50* | (2022.01) |

(52) U.S. Cl.
CPC ..... *G02B 27/0172* (2013.01); *G02B 27/0093* (2013.01); *G06F 3/016* (2013.01); *G06F 3/16* (2013.01); *G06V 10/82* (2022.01); *G06V 20/50* (2022.01); *G02B 2027/0138* (2013.01); *G02B 2027/014* (2013.01)

(58) Field of Classification Search
None
See application file for complete search history.

(56) References Cited

U.S. PATENT DOCUMENTS

| | | |
|---|---|---|
| 2019/0189259 A1 | 6/2019 | Clark |
| 2020/0275848 A1* | 9/2020 | Goldberg ............... A61B 5/486 |
| 2024/0045470 A1 | 2/2024 | Aimone et al. |

FOREIGN PATENT DOCUMENTS

| | | |
|---|---|---|
| DE | 102019125623 A1 | 3/2020 |
| WO | 2023183340 A1 | 9/2023 |

OTHER PUBLICATIONS

Kevin Menear, "Mind and Machine: How AI is Enhancing the Meditation Experience by Personalizing the Path to Inner Peace," Jan. 18, 2023, Medium.

* cited by examiner

*Primary Examiner* — Christopher J Kohlman
(74) *Attorney, Agent, or Firm* — Treyz Law Group, P.C.; Joseph F. Guihan

(57) ABSTRACT

A head-mounted device may include one or more cameras that detect physical objects in a physical environment surrounding the head-mounted device and one or more microphones that detect sounds in the physical environment. The head-mounted device may present a guided meditation session that references one of the physical objects in the physical environment and/or one of the sounds in the physical environment. One or more sensors in the head-mounted device may be used to determine when to advance the guided meditation session between different portions.

27 Claims, 4 Drawing Sheets

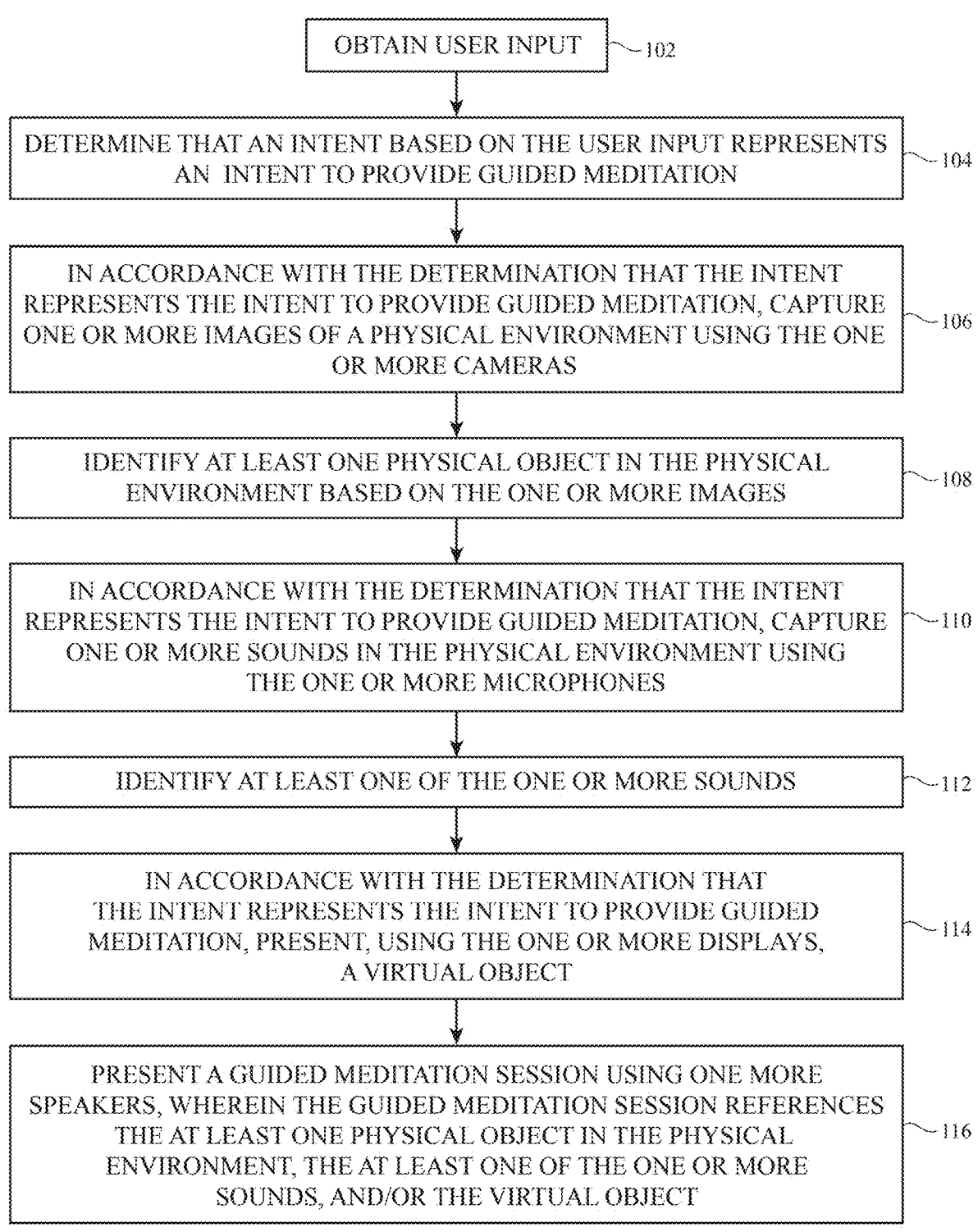

OBTAIN USER INPUT ~102

DETERMINE THAT AN INTENT BASED ON THE USER INPUT REPRESENTS AN INTENT TO PROVIDE GUIDED MEDITATION ~104

IN ACCORDANCE WITH THE DETERMINATION THAT THE INTENT REPRESENTS THE INTENT TO PROVIDE GUIDED MEDITATION, CAPTURE ONE OR MORE IMAGES OF A PHYSICAL ENVIRONMENT USING THE ONE OR MORE CAMERAS ~106

IDENTIFY AT LEAST ONE PHYSICAL OBJECT IN THE PHYSICAL ENVIRONMENT BASED ON THE ONE OR MORE IMAGES ~108

IN ACCORDANCE WITH THE DETERMINATION THAT THE INTENT REPRESENTS THE INTENT TO PROVIDE GUIDED MEDITATION, CAPTURE ONE OR MORE SOUNDS IN THE PHYSICAL ENVIRONMENT USING THE ONE OR MORE MICROPHONES ~110

IDENTIFY AT LEAST ONE OF THE ONE OR MORE SOUNDS ~112

IN ACCORDANCE WITH THE DETERMINATION THAT THE INTENT REPRESENTS THE INTENT TO PROVIDE GUIDED MEDITATION, PRESENT, USING THE ONE OR MORE DISPLAYS, A VIRTUAL OBJECT ~114

PRESENT A GUIDED MEDITATION SESSION USING ONE MORE SPEAKERS, WHEREIN THE GUIDED MEDITATION SESSION REFERENCES THE AT LEAST ONE PHYSICAL OBJECT IN THE PHYSICAL ENVIRONMENT, THE AT LEAST ONE OF THE ONE OR MORE SOUNDS, AND/OR THE VIRTUAL OBJECT ~116

*FIG. 3*

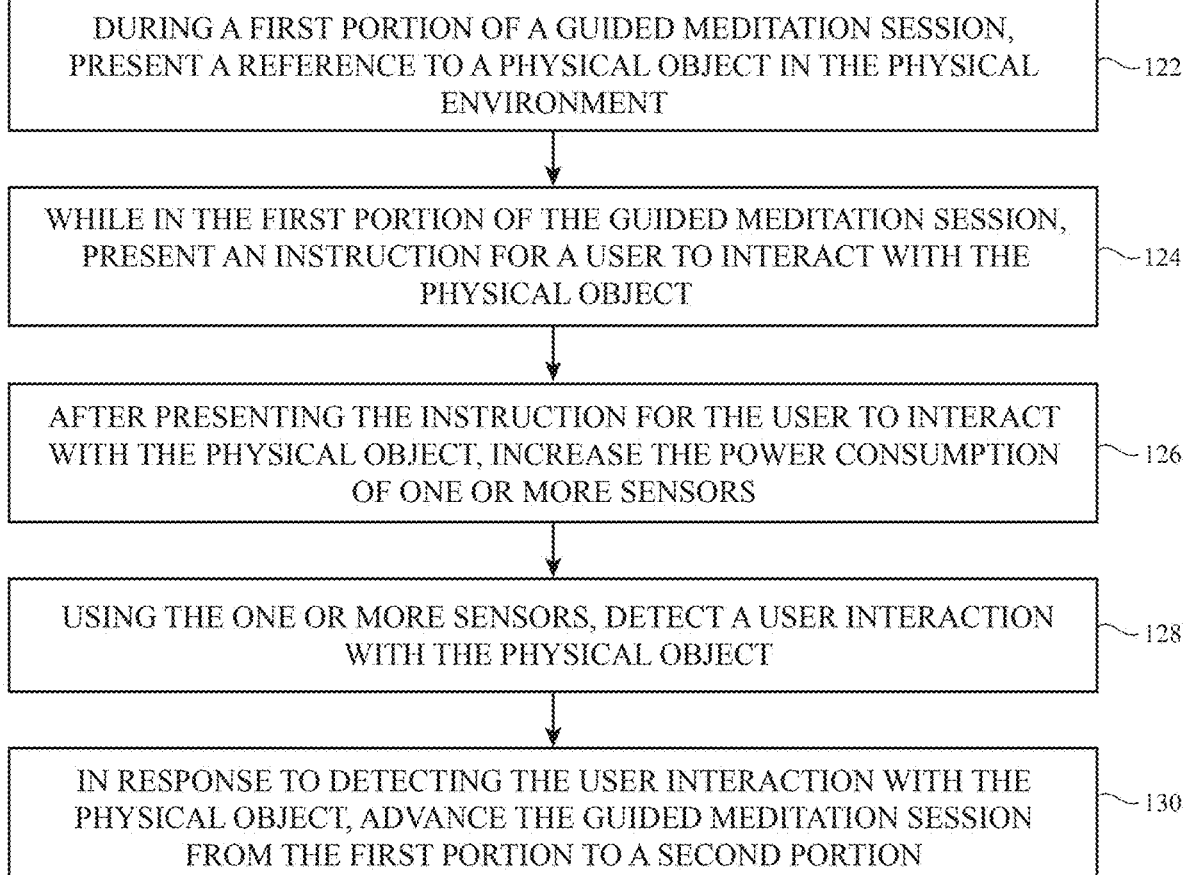

DURING A FIRST PORTION OF A GUIDED MEDITATION SESSION, PRESENT A REFERENCE TO A PHYSICAL OBJECT IN THE PHYSICAL ENVIRONMENT ~122

WHILE IN THE FIRST PORTION OF THE GUIDED MEDITATION SESSION, PRESENT AN INSTRUCTION FOR A USER TO INTERACT WITH THE PHYSICAL OBJECT ~124

AFTER PRESENTING THE INSTRUCTION FOR THE USER TO INTERACT WITH THE PHYSICAL OBJECT, INCREASE THE POWER CONSUMPTION OF ONE OR MORE SENSORS ~126

USING THE ONE OR MORE SENSORS, DETECT A USER INTERACTION WITH THE PHYSICAL OBJECT ~128

IN RESPONSE TO DETECTING THE USER INTERACTION WITH THE PHYSICAL OBJECT, ADVANCE THE GUIDED MEDITATION SESSION FROM THE FIRST PORTION TO A SECOND PORTION ~130

*FIG. 4*

ELECTRONIC DEVICE THAT PRESENTS GUIDED MEDITATION SESSIONS

This application claims the benefit of U.S. provisional patent application No. 63/688,679, filed Aug. 29, 2024, which is hereby incorporated by reference herein in its entirety.

BACKGROUND

This relates generally to electronic devices, and, more particularly, to electronic devices with sensors.

Some electronic devices may be used to assist a user in guided meditation. The electronic device may provide audio instructions for the guided meditation. However, the guided meditation may be less interactive than desired.

It is within this context that the embodiments herein arise.

SUMMARY

An electronic device may include one or more cameras, one or more speakers, one or more processors, and memory storing instructions configured to be executed by the one or more processors, the instructions for: obtaining a user input, determining an intent based on the user input, and in accordance with a determination that the intent represents an intent to provide guided meditation: capturing one or more images of a physical environment using the one or more cameras, identifying at least one physical object in the physical environment based on the one or more images, and presenting a guided meditation session using the one more speakers. The guided meditation session may reference the at least one physical object in the physical environment.

BRIEF DESCRIPTION OF THE DRAWINGS

FIG. 3 is a flowchart showing an illustrative method for operating a head-mounted device that presents a guided meditation session in accordance with some embodiments.

FIG. 4 is a flowchart showing an illustrative method for operating a head-mounted device during an interactive guided meditation session in accordance with some embodiments.

DETAILED DESCRIPTION

Figure 1:
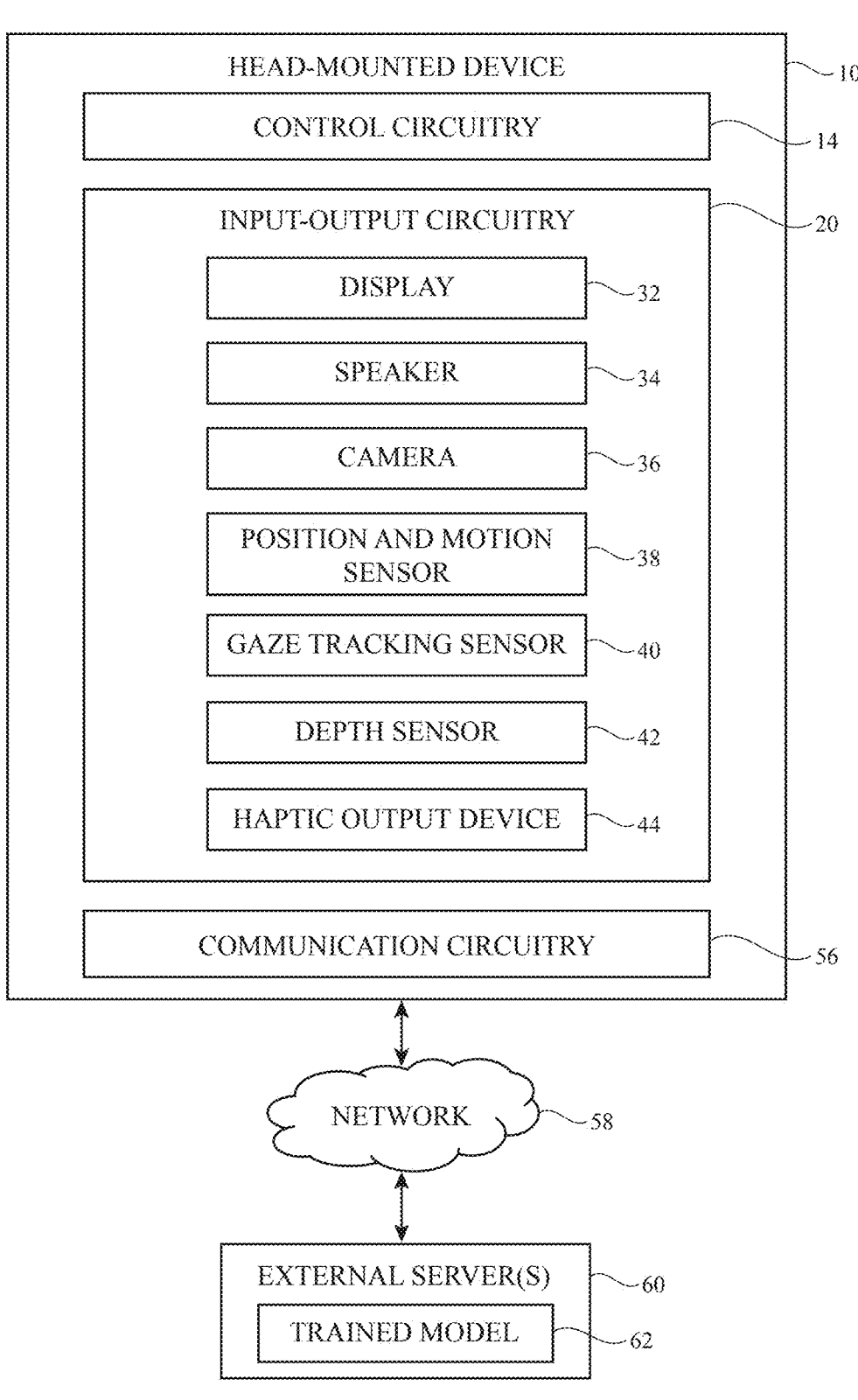
FIG. 1 is a schematic diagram of an illustrative head-mounted device in accordance with some embodiments.

Head-mounted devices may display different types of extended reality content for a user. The head-mounted device may display a virtual object that is perceived at an apparent depth within the physical environment of the user. Virtual objects may sometimes be displayed at fixed locations relative to the physical environment of the user. For example, consider an example where a user's physical environment includes a table. A virtual object may be displayed for the user such that the virtual object appears to be resting on the table. As the user moves their head and otherwise interacts with the XR environment, the virtual object remains at the same, fixed position on the table (e.g., as if the virtual object were another physical object in the XR environment). This type of content may be referred to as world-locked content (because the position of the virtual object is fixed relative to the physical environment of the user).

Other virtual objects may be displayed at locations that are defined relative to the head-mounted device or a user of the head-mounted device. First, consider the example of virtual objects that are displayed at locations that are defined relative to the head-mounted device. As the head-mounted device moves (e.g., with the rotation of the user's head), the virtual object remains in a fixed position relative to the head-mounted device. For example, the virtual object may be displayed in the front and center of the head-mounted device (e.g., in the center of the device's or user's field-of-view) at a particular distance. As the user moves their head left and right, their view of their physical environment changes accordingly. However, the virtual object may remain fixed in the center of the device's or user's field of view at the particular distance as the user moves their head (assuming gaze direction remains constant). This type of content may be referred to as head-locked content. The head-locked content is fixed in a given position relative to the head-mounted device (and therefore the user's head which is supporting the head-mounted device). The head-locked content may not be adjusted based on a user's gaze direction. In other words, if the user's head position remains constant and their gaze is directed away from the head-locked content, the head-locked content will remain in the same apparent position.

Second, consider the example of virtual objects that are displayed at locations that are defined relative to a portion of the user of the head-mounted device (e.g., relative to the user's torso). This type of content may be referred to as body-locked content. For example, a virtual object may be displayed in front and to the left of a user's body (e.g., at a location defined by a distance and an angular offset from a forward-facing direction of the user's torso), regardless of which direction the user's head is facing. If the user's body is facing a first direction, the virtual object will be displayed in front and to the left of the user's body. While facing the first direction, the virtual object may remain at the same, fixed position relative to the user's body in the XR environment despite the user rotating their head left and right (to look towards and away from the virtual object). However, the virtual object may move within the device's or user's field of view in response to the user rotating their head. If the user turns around and their body faces a second direction that is the opposite of the first direction, the virtual object will be repositioned within the XR environment such that it is still displayed in front and to the left of the user's body. While facing the second direction, the virtual object may remain at the same, fixed position relative to the user's body in the XR environment despite the user rotating their head left and right (to look towards and away from the virtual object).

In the aforementioned example, body-locked content is displayed at a fixed position/orientation relative to the user's body even as the user's body rotates. For example, the virtual object may be displayed at a fixed distance in front of the user's body. If the user is facing north, the virtual object is in front of the user's body (to the north) by the fixed distance. If the user rotates and is facing south, the virtual object is in front of the user's body (to the south) by the fixed distance.

Alternatively, the distance offset between the body-locked content and the user may be fixed relative to the user whereas the orientation of the body-locked content may remain fixed relative to the physical environment. For example, the virtual object may be displayed in front of the user's body at a fixed distance from the user as the user faces north. If the user rotates and is facing south, the virtual object remains to the north of the user's body at the fixed distance from the user's body.

Body-locked content may also be configured to always remain gravity or horizon aligned, such that head and/or body changes in the roll orientation would not cause the body-locked content to move within the XR environment. Translational movement may cause the body-locked content to be repositioned within the XR environment to maintain the fixed distance from the user. Subsequent descriptions of body-locked content may include both of the aforementioned types of body-locked content.

A schematic diagram of an illustrative head-mounted device is shown in FIG. 1. As shown in FIG. 1, head-mounted device 10 (sometimes referred to as electronic device 10, system 10, head-mounted display 10, etc.) may have control circuitry 14. Control circuitry 14 may be configured to perform operations in head-mounted device 10 using hardware (e.g., dedicated hardware or circuitry), firmware and/or software. Software code for performing operations in head-mounted device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

Head-mounted device 10 may include input-output circuitry 20. Input-output circuitry 20 may be used to allow data to be received by head-mounted device 10 from external equipment (e.g., a tethered computer, a portable device such as a handheld device or laptop computer, or other electrical equipment) and to allow a user to provide head-mounted device 10 with user input. Input-output circuitry 20 may also be used to gather information on the environment in which head-mounted device 10 is operating. Output components in circuitry 20 may allow head-mounted device 10 to provide a user with output and may be used to communicate with external electrical equipment.

As shown in FIG. 1, input-output circuitry 20 may include a display such as display 32. Display 32 may be used to display images for a user of head-mounted device 10. Display 32 may be a transparent display (sometimes referred to as a see-through display) so that a user may observe physical objects through the display while computer-generated content is overlaid on top of the physical objects by presenting computer-generated images on the display. A transparent display may be formed from a transparent pixel array (e.g., a transparent organic light-emitting diode display panel) or may be formed by a display device that provides images to a user through a beam splitter, holographic coupler, or other optical coupler (e.g., a display device such as a liquid crystal on silicon display). Alternatively, display 32 may be an opaque display that blocks light from physical objects when a user operates head-mounted device 10. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 32 is opaque, the display may also optionally display entirely computer-generated content (e.g., without displaying images of the physical environment).

Display 32 may include one or more optical systems (e.g., lenses) that allow a viewer to view images on display(s) 32. A single display 32 may produce images for both eyes or a pair of displays 32 may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

Input-output circuitry 20 may include various other input-output devices for gathering data and user input and for supplying a user with output. For example, input-output circuitry 20 may include one or more speakers 34 that are configured to play audio.

Input-output circuitry 20 may include one or more cameras 36. Cameras 36 may include one or more outward-facing cameras (that face the physical environment around the user when the electronic device is mounted on the user's head, as one example). Cameras 36 may capture visible light images, infrared images, or images of any other desired type. The cameras may be stereo cameras if desired. Outward-facing cameras may capture pass-through video for device 10. Cameras 22 may also include inward-facing cameras (e.g., for gaze detection).

Input-output circuitry 20 may include a gaze-tracker 40 (sometimes referred to as a gaze-tracking system or a gaze-tracking camera). The gaze-tracker 40 may be used to obtain gaze input from the user during operation of head-mounted device 10.

Gaze-tracker 40 may include a camera and/or other gaze-tracking system components (e.g., light sources that emit beams of light so that reflections of the beams from a user's eyes may be detected) to monitor the user's eyes. Gaze-tracker(s) 40 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 40 is merely illustrative.

As shown in FIG. 1, input-output circuitry 20 may include position and motion sensors 38 (e.g., compasses, gyroscopes, accelerometers, and/or other devices for monitoring the location, orientation, and movement of head-mounted device 10, satellite navigation system circuitry such as Global Positioning System circuitry for monitoring user location, etc.). Gyroscopes may measure orientation and angular velocity of the electronic device. As one example, electronic device 10 may include a first gyroscope that is configured to measure rotation about a first axis, a second gyroscope that is configured to measure rotation about a second axis that is orthogonal to the first axis, and a third gyroscope that is configured to measure rotation about a third axis that is orthogonal to the first and second axes. An accelerometer may measure the acceleration felt by the electronic device. As one example, electronic device 10 may include a first accelerometer that is configured to measure acceleration along a first axis, a second accelerometer that is configured to measure acceleration along a second axis that is orthogonal to the first axis, and a third accelerometer that is configured to measure acceleration along a third axis that is orthogonal to the first and second axes. Multiple sensors may optionally be included in a single sensor package referred to as an inertial measurement unit (IMU). Electronic device 10 may include one or more magnetometers that are configured to measure magnetic field. As an example, three magnetometers may be included in an IMU with three accelerometers and three gyroscopes.

Using sensors 38, for example, control circuitry 14 can monitor the current direction in which a user's head is oriented relative to the surrounding environment (e.g., a user's head pose). In one example, position and motion sensors 38 may include one or more outward-facing cameras (e.g., that capture images of a physical environment surrounding the user). The outward-facing cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique). In addition to being used for position and motion sensing, the outward-facing camera may capture pass-through video for device 10.

Input-output circuitry 20 may include one or more depth sensors 42. Each depth sensor may be a pixelated depth sensor (e.g., that is configured to measure multiple depths across the physical environment) or a point sensor (that is configured to measure a single depth in the physical environment). Camera images (e.g., from one of cameras 36) may also be used for monocular and/or stereo depth estimation. Each depth sensor (whether a pixelated depth sensor or a point sensor) may use phase detection (e.g., phase detection autofocus pixel(s)) or light detection and ranging (LIDAR) to measure depth. Any combination of depth sensors may be used to determine the depth of physical objects in the physical environment.

Input-output circuitry 20 may include a haptic output device 44. The haptic output device 44 may include actuators such as electromagnetic actuators, motors, piezoelectric actuators, electroactive polymer actuators, vibrators, linear actuators (e.g., linear resonant actuators), rotational actuators, actuators that bend bendable members, etc. The haptic output device 44 may be controlled to provide any desired pattern of vibrations.

Input-output circuitry 20 may also include other sensors and input-output components if desired (e.g., ambient light sensors, force sensors, temperature sensors, touch sensors, buttons, capacitive proximity sensors, light-based proximity sensors, other proximity sensors, strain gauges, gas sensors, pressure sensors, moisture sensors, magnetic sensors, microphones, light-emitting diodes, other light sources, heart rate sensors, electroencephalography (EEG) sensors, wired and/or wireless communications circuitry, etc.).

Head-mounted device 10 may also include communication circuitry 56 to allow the head-mounted device to communicate with external equipment (e.g., a tethered computer, a portable electronic device, one or more external servers, or other electrical equipment). Communication circuitry 56 may be used for both wired and wireless communication with external equipment.

Communication circuitry 56 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

The radio-frequency transceiver circuitry in wireless communications circuitry 56 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHZ), and/or any other desired communications bands.

The radio-frequency transceiver circuitry may include millimeter/centimeter wave transceiver circuitry that supports communications at frequencies between about 10 GHz and 300 GHz. For example, the millimeter/centimeter wave transceiver circuitry may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, the millimeter/centimeter wave transceiver circuitry may support communications in an IEEE K communications band between about 18 GHz and 27 GHz, a $K_a$ communications band between about 26.5 GHZ and 40 GHZ, a Ku communications band between about 12 GHZ and 18 GHz, a V communications band between about 40 GHz and 75 GHz, a W communications band between about 75 GHz and 110 GHz, or any other desired frequency band between approximately 10 GHz and 300 GHz. If desired, the millimeter/centimeter wave transceiver circuitry may support IEEE 802.11ad communications at 60 GHZ (e.g., WiGig or 60 GHz Wi-Fi bands around 57-61 GHZ), and/or $5^{th}$ generation mobile networks or $5^{th}$ generation wireless systems (5G) New Radio (NR) Frequency Range 2 (FR2) communications bands between about 24 GHz and 90 GHz.

Antennas in wireless communications circuitry 56 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link and another type of antenna may be used in forming a remote wireless link antenna.

During operation, head-mounted device 10 may use communication circuitry 56 to communicate with one or more external servers 60 through network(s) 58. Examples of communication network(s) 58 include local area networks (LAN) and wide area networks (WAN) (e.g., the Internet). Communication network(s) 58 may be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol.

External server(s) 60 may be implemented on one or more standalone data processing apparatus or a distributed network of computers. External server 60 may include a trained model 62 such as a large language model (LLM). Trained model 62 may generate a guided meditation session that is presented using head-mounted device 10 based on various inputs provided by head-mounted device 10.

Consider an example where the user of head-mounted device 10 provides input indicating a request for guided meditation. The user may request a specific type of guided meditation, may identify a target length of time for the guided meditation session, may provide a goal for the guided meditation, etc. Based on this information, trained model 62 may generate a guided meditation session. Head-mounted device 10 may play audio using speaker 34 and/or present visual objects using display 32 as part of the guided meditation session.

The guided meditation session may optionally reference one or more physical objects or sounds in the physical environment of the user. Trained model 62 may identify (or receive information identifying) one or more physical objects or sounds in the physical environment of the user. The guided meditation session generated by the trained model may reference the one or more physical objects or sounds in the physical environment.

As a specific example, consider a scenario where the user of head-mounted device requests a ten minute guided meditation session. In this scenario, the user is sitting at a table next to a window with a glass of water on the table. Sunlight passes through the window and illuminates the glass of water. When the user requests the ten minute guided meditation session, the head-mounted device may capture images using camera(s) 36. Using the captured images, head-mounted device 10 may identify the sunlit glass of water as a physical object that is well suited to incorporation into a guided meditation session. The guided meditation session generated by trained model 62 may include audio that asks the user to look at the glass of water (e.g., patterns of refraction and reflection caused by the glass of water), that asks the user to pick up the glass of water, that asks the user to rotate the glass of water, etc. In this example, the guided meditation session includes references to a physical object that is present in the physical environment of the user.

The guided meditation session may, instead or in addition, include references to one or more sounds that are present in the physical environment of the user. In this scenario, the physical environment includes birds that are chirping outside the window. When the user requests the ten minute guided meditation session, the head-mounted device may capture audio using one or more microphones. Using the captured audio, head-mounted device 10 may identify the sounds of the chirping birds. The guided meditation session generated by trained model 62 may include audio that asks the user to listen to the chirping birds. In this example, the guided meditation session includes references to a sound that is present in the physical environment of the user.

Trained model 62 may be a large language model. A large language model (LLM) is an artificial intelligence system designed to understand and generate human language text. Large language models (LLMs) belong to the broader category of natural language processing (NLP) models and have the ability to process and generate text that is coherent, contextually relevant, and grammatically accurate. Large language models may be built using deep learning techniques (e.g., neural networks) which enable them to learn patterns and associations within vast amounts of textual data. LLMs are trained on datasets containing billions of words, which allows them to capture the nuances and complexities of human language. Large language models are characterized by their large scale (e.g., having a least one hundred million parameters, having at least one billion parameters, at least ten billion parameters, at least one hundred billion parameters, etc.).

Trained model 62 may therefore sometimes be referred to as artificial intelligence (AI) system 62, language model 62, large language model 62, natural language processing model 62, etc. Trained model 62 may be configured to output human language text in response to input. Trained model 62 may include at least one billion parameters, at least ten billion parameters, at least one hundred billion parameters, etc.

The example in FIG. 1 of trained model 62 being stored in external server(s) 60 is merely illustrative. Trained model 62 may be stored in a companion electronic device that wirelessly communicates with head-mounted device 10. In other words, external server(s) 60 may comprise an electronic device (e.g., cellular telephone, laptop computer, tablet computer, etc.) that stores trained model 62. Alternatively, trained model 62 may be stored in control circuitry 14 of head-mounted device 10.

Figure 2:
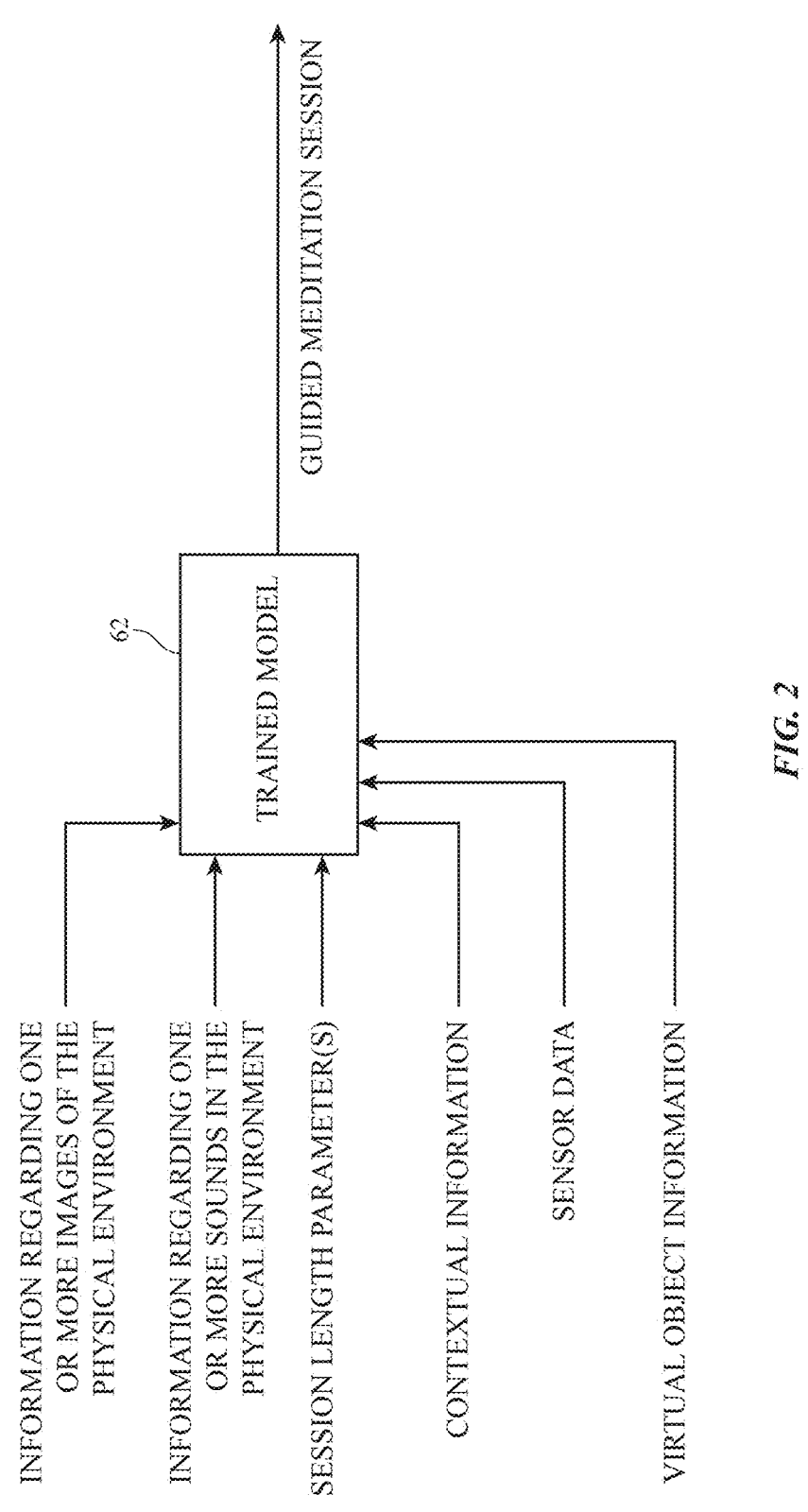
FIG. 2 is a schematic diagram of a trained model that receives inputs and generates a guided meditation session in accordance with some embodiments.

FIG. 2 is a schematic diagram showing inputs that may be provided to trained model 62 in FIG. 1. As shown in FIG. 2, trained model 62 may generate the guided meditation session based on various inputs. The inputs to the trained model may include information regarding one or more images of the physical environment, information regarding one or more sounds in the physical environment, one or more session length parameters, contextual information, sensor data, and/or virtual object information.

The information regarding one or more images of the physical environment may include images of the physical environment captured by camera(s) 36 of head-mounted device 10. Instead or in addition, control circuitry 14 may perform image recognition on one or more images captured by camera(s) 36 of head-mounted device 10 to identify one or more physical objects in the physical environment. Control circuitry 14 may provide the identities of the one or more physical objects in the physical environment to trained model 62.

Certain types of physical objects may be well suited to incorporation into a guided meditation session. Control circuitry 14 may optionally identify physical objects that are well suited to incorporation into the guided meditation session and provide the identities of these physical objects to the trained model. Alternatively, trained model 62 may determine which physical object(s) in the physical environment are well suited to incorporation into the guided meditation session.

Control circuitry 14 and/or trained model 62 may store a list of physical objects that are well suited to incorporation into a guided meditation session. Instead or in addition, control circuitry 14 and/or trained model 62 may identify physical objects in the physical environment that satisfy one or more criteria. For example, a physical object may be well suited to incorporation into a guided meditation session when the physical object satisfies a reflectivity criterion. Control circuitry 14 and/or trained model 62 may identify physical objects in the physical environment that satisfy the reflectivity criterion. The physical objects that satisfy the reflectivity criterion may be referenced in the guided meditation session generated by trained model 62.

The information regarding one or more sounds in the physical environment may include audio of the physical environment captured by one or more microphones in head-mounted device 10. Instead or in addition, control circuitry 14 may perform sound recognition on the audio captured by the microphone(s) of head-mounted device 10 to identify one or more sounds in the physical environment. Control circuitry 14 may provide the identities of the one or more sounds in the physical environment to trained model 62.

Certain types of sounds may be well suited to incorporation into a guided meditation session. Control circuitry 14 may optionally identify sounds that are well suited to incorporation into the guided meditation session and provide the identities of these sounds to the trained model. Alternatively, trained model 62 may determine which sound(s) in the physical environment are well suited to incorporation into the guided meditation session.

Control circuitry 14 and/or trained model 62 may store a list of sounds that are well suited to incorporation into a guided meditation session. Instead or in addition, control circuitry 14 and/or trained model 62 may identify sounds in the physical environment that satisfy one or more criteria. The sound(s) that satisfy the criteria may be referenced in the guided meditation session generated by trained model 62.

The session length parameters may include one or more parameters associated with the length of the guided meditation session. The session length parameters may include a minimum duration, a maximum duration, a target duration, etc. When providing an input requesting guided meditation, the user may provide additional input identifying one or more session length parameters.

The contextual information provided by head-mounted device 10 to trained model 62 may include information such as location information, cultural information, age information, user preference information, temporal information, calendar information, meditation experience information, etc.

The location information may include a city of residence of the user of head-mounted device 10, the current city in which head-mounted device 10 is located, etc. With all else being equal, the trained model 62 may provide a different guided meditation session to a first user in a first location than a second user in a second location or may provide a different guided meditation session to a first user with a first city of residence than a second user with a second, different city of residence. Current location information that is included in the location information provided to trained model 62 may be obtained using a global positioning system (GPS) sensor in head-mounted device 10, may be provided to head-mounted device 10 directly by the user, etc.

The cultural information may include a cultural background of the user of head-mounted device 10, cultural information associated with the current location of head-mounted device 10, etc. For example, a user with a first cultural background may receive a guided meditation session that references a cultural custom associated with the first cultural background. A second user with a second cultural background that does not include the cultural custom may receive a second guided meditation session that does not reference the cultural custom.

The age information may include the age of the user of the head-mounted device. The complexity of the guided meditation session provided by trained model 62 may be adjusted based on the age of the user of the head-mounted device. For example, all else being equal, a first user of a first age may receive a first guided meditation session whereas a second user of a second age that is greater than the first age may receive a second guided meditation session that is more complex than the first guided meditation.

The user preference information may include any desired user preferences regarding the tone, length, and/or type of guided meditation provided by trained model 62. The user preferences may be provided to head-mounted device 10 using one or more input components.

The temporal information may include information regarding the current time of day or the current time of year. With all else equal, the trained model may output a first guided meditation session at a first time of day and may output a second, different guided meditation session at a second, different time of day. With all else equal, the trained model may output a first guided meditation session at a first time of year and may output a second, different guided meditation session for the given text at a second, different time of year.

The calendar information may include information from the user's calendar such as upcoming appointments, previous appointments, travel, etc. If the calendar information identifies an upcoming vacation to a given location, the guided meditation session output by the trained model may be different than if there was no upcoming vacation to the given location. If the calendar information identifies an upcoming appointment, the guided meditation session output by the trained model may be different than if there was no upcoming appointment.

The meditation experience information may include information regarding the user's past experience with meditation.

The meditation experience information may include information regarding prior guided meditation sessions (e.g., the frequency, length, and type of prior sessions) provided by head-mounted device 10. The meditation experience information may also include information input by the user. For example, the user may provide input identifying their experience level as novice, moderate, expert, etc. The user may provide input identifying the type of meditation they have practiced (if any).

The sensor data provided by head-mounted device 10 to trained model 62 may include data from any desired sensors in input-output circuitry 20. The sensor data may include data from a heart rate sensor, an electroencephalography (EEG) sensor, a blood pressure sensor, depth sensor 42, gaze tracking sensor 40, position and motion sensor 38, and/or another desired sensor.

Head-mounted device 10 may present virtual objects using display 32. The virtual objects may be part of an XR environment. The virtual objects may include head-locked virtual objects, body-locked virtual objects, and/or world-locked virtual objects. The virtual object information provided to trained model 62 may include information identifying the locations, types, and appearances of one or more virtual objects presented by display 32. The guided meditation session may reference one or more of the virtual objects (e.g., with instructions to look at one or more of the virtual objects). The guided meditation session may also include displaying new virtual objects on display 32 while presenting the guided meditation session.

The guided meditation session generated by trained model 62 in FIG. 2 may include audio and/or visual components. The audio components may include verbal instructions that are recited by a virtual instructor, background music/sounds, audio feedback in response to actions by the user, etc. The visual components may include a virtual reality environment that is presented to the user during the guided meditation session and/or a virtual object that is presented in the virtual environment or in an XR environment (e.g., the virtual object may be presented to appear in the user's physical environment).

The guided meditation session output by trained model 62 may be a defined guided meditation session that is not interactive with the user in real time. In these types of examples, the verbal instructions from the virtual instructor may be delivered at predetermined times (regardless of how the user is performing during the guided meditation session).

Alternatively, the guided meditation session output by trained model 62 may be dynamically updated and/or generated throughout the session. For example, the guided meditation session may include a verbal instruction from a virtual instructor to take deep breaths. The trained model may receive real time sensor data such as heart rate sensor data. The guided meditation session may proceed to a subsequent instruction only after the user's heart rate has slowed by a threshold amount or below a target.

Another example of a dynamically updated guided meditation session is a guided meditation session that relies on user interaction with a physical object in their physical environment. For example, the guided meditation session may include a verbal instruction from a virtual instructor to look at the physical object. The trained model may receive real time sensor data such as gaze detection data. The guided meditation session may proceed to a subsequent instruction only after the user's gaze is aligned with the physical object. The guided meditation session may then include a verbal instruction from the virtual instructor to pick up the physical object. The trained model may receive information regarding one or more images of the physical environment in real time. For example, the trained model may receive one or more images of the physical environment in real time or control circuitry 14 may provide information to the trained model when control circuitry 14 detects that the user has picked up the virtual object. The guided meditation session may proceed to a subsequent instruction only after the user picks up the physical object. The guided meditation session may then include a verbal instruction from the virtual instructor to rotate the physical object. The trained model may receive information regarding one or more images of the physical environment in real time. For example, the trained model may receive one or more images of the physical environment in real time or control circuitry 14 may provide information to the trained model when control circuitry 14 detects that the user has rotated the virtual object. The guided meditation session may proceed to a subsequent instruction only after the user rotates the physical object.

FIG. 3 is a flowchart showing an illustrative method for operating a head-mounted device that presents a guided meditation session. During the operations of block 102, the head-mounted device 10 (e.g., control circuitry 14) may obtain a user input. The user input may include a gaze gesture obtained using gaze tracking sensor 40, a head gesture (e.g., a nod or head movement) obtained using position and motion sensors 38, a voice command obtained using a microphone, a hand gesture (e.g., a finger point) obtained using one or more cameras 36, a button press obtained using a button, and/or a touch input obtained using a touch sensor.

The user input received during the operations of block 102 may also include user input that is received at an external electronic device and communicated to head-mounted device 10 using communication circuitry 56. Head-mounted device 10 may wirelessly communicate with an external electronic device such as a tablet computer, a cellular telephone, a laptop computer, a watch, etc. The user may provide user input to the external electronic device (e.g., a voice command provided to a microphone in the external electronic device, a touch input to a touch-sensitive display in the external electronic device, etc.) that is wirelessly communicated to head-mounted device 10.

During the operations of block 104, head-mounted device 10 (e.g., control circuitry 14) may determine an intent based on the user input. The intent may be, for example, an intent to provide guided meditation.

During the operations of block 106, in accordance with a determination that the user intent represents an intent to provide guided meditation, head-mounted device 10 (e.g., control circuitry 14) may capture one or more images of a physical environment using camera(s) 36. One or more cameras 36 may be turned on (or may have a sampling rate increased) at block 106 in accordance with a determination that the user intent represents an intent to provide guided meditation. One or more additional sensors (e.g., a depth sensor, a heart rate sensor, a gaze tracking sensor, etc.) may be turned on (or may have a sampling rate increased) at block 106 in accordance with a determination that the user intent represents an intent to provide guided meditation.

During the operations of block 108, control circuitry 14 may identify at least one physical object in the physical environment based on the one or more images captured during the operations of block 106. Control circuitry 14 may optionally provide information regarding the one or more images to trained model 62 and the trained model may identify the at least one physical object in the physical environment.

During the operations of block 108, control circuitry 14 and/or trained model 62 may identify one or more physical objects that are well suited to incorporation into guided meditation. Control circuitry 14 and/or trained model 62 may identify a physical object that is well suited to incorporation into guided meditation by comparing the identity of each physical object to a list of physical objects that are well suited to incorporation into guided meditation or by determining whether each identified physical object satisfies one or more criteria (e.g., a reflectivity criterion).

After the operations of blocks 106 and/or 108, the power consumption of the cameras may be decreased (e.g., the cameras may be turned off or a sampling rate of the cameras may be decreased).

During the operations of block 110, in accordance with a determination that the user intent represents an intent to provide guided meditation, head-mounted device 10 (e.g., control circuitry 14) may capture one or more sounds in the physical environment using one or more microphones. One or more microphones may be turned on (or may have a sampling rate increased) at block 110 in accordance with a determination that the user intent represents an intent to provide guided meditation.

During the operations of block 112, control circuitry 14 may identify at least one sound in the physical environment based on the one or more sounds captured during the operations of block 110. Control circuitry 14 may optionally provide information regarding the one or more sounds to trained model 62 and the trained model may identify the at least one sound in the physical environment.

During the operations of block 112, control circuitry 14 may identify one or more sounds that are well suited to incorporation into guided meditation. Control circuitry and/or trained model 62 may identify a sound that is well suited to incorporation into guided meditation by comparing the identity of each sound to a list of sounds that are well suited to incorporation into guided meditation or by determining whether each identified sound satisfies one or more criteria.

After the operations of blocks 110 and/or 112, the power consumption of the microphones may be decreased (e.g., the microphones may be turned off or a sampling rate of the microphones may be decreased).

During the operations of block 114, in accordance with a determination that the user intent represents an intent to provide guided meditation, head-mounted device 10 may present, using one or more displays, a virtual object. Head-mounted device 10 may already be presenting one or more virtual objects on display 32 before the operations of block 102. After the user input requesting guided meditation, the one or more virtual objects on display 32 may remain on display 32 during the guided meditation session. Instead or in addition, display 32 may newly present one or more virtual objects as part of the guided meditation session during the operations of block 114.

As an example, display 32 may display a first virtual object while the user input is received during the operations of block 102. The first virtual object may be displayed throughout the guided meditation session. Additionally, display 32 may, during the operations of block 114, display a second virtual object after the operations of block 102 in accordance with a determination that the user intent represents an intent to provide guided meditation (during the operations of block 104).

During the operations of block 116, head-mounted device 10 may present a guided meditation using one or more speakers 34 and/or display 32. The guided meditation session may reference the at least one physical object in the physical environment that is identified during the operations of block 108, the at least one of the one or more sounds that is identified during the operations of block 112, and/or the virtual object(s) on display 32 (e.g., from the operations of block 114).

One or more of the operations of FIG. 3 may be performed using trained model 62. Trained model 62 may perform the operations of block 108 and/or block 112. Trained model 62 may also generate the guided meditation session that is presented by head-mounted device 10 during the operations of block 116. Trained model 62 may output audio information and/or display information for the guided meditation session. Head-mounted device 10 may play audio for the guided meditation based on the audio information generated by the trained model. Head-mounted device 10 may display one or more virtual objects for the guided meditation based on the display information generated by the trained model.

The guided meditation session generated by trained model 62 (and presented by head-mounted device 10 during the operations of block 116) may be based on information regarding one or more images of the physical environment, information regarding one or more sounds in the physical environment, one or more session length parameters, contextual information, sensor data, and/or virtual object information (as shown and discussed in connection with FIG. 2).

The example in FIG. 2 of generating a guided meditation session using a trained model is merely illustrative. In another possible arrangement, head-mounted device 10 may generate the guided meditation session using one or more stored guided meditation sessions. The stored guided meditation sessions may have characteristics such as length, meditation type, physical object references, sound references, virtual object references, etc. Control circuitry 14 may select an appropriate guided meditation session from the stored guided meditation sessions based on the real time conditions (e.g., session length parameters, user input, requested meditation type, physical objects identified in the physical environment, sounds identified in the physical environment, etc.).

As a first example, a user may, during the operations of block 102, provide a voice command to head-mounted device 10 that is detected using a microphone in head-mounted device 10. The voice command may include a request for a five minute guided meditation session (without any other specific parameters). During the operations of block 104, head-mounted device 10 may determine that an intent based on the user input represents an intent to provide guided meditation. During the operations of block 106, the power consumption of one or more cameras 36 in head-mounted device 10 is increased (e.g., the cameras are turned on or a sampling rate of the cameras is increased) and the cameras capture one or more images of a physical environment of the user. During the operations of block 108, control circuitry 14 in head-mounted device 10 may identify a bouquet of flowers in the physical environment based on the one or more images captured by cameras 36. During the operations of block 110, the power consumption of one or more microphones in head-mounted device 10 is increased (e.g., the microphones are turned on or a sampling rate of the microphones is increased) and the microphones capture one or more sounds of a physical environment of the user. During the operations of block 112, control circuitry 14 in head-mounted device 10 may identify a ticking analog clock based on the audio captured by the microphones.

In the first example, head-mounted device 10 communicates wirelessly with a trained model 62 that is stored on external server(s) 60 (which may include a paired companion electronic device). Head-mounted device 10 may wirelessly transmit various inputs to the trained model such as information regarding one or more images of the physical environment (e.g., there is a bouquet of flowers in the user's physical environment), information regarding one or more sounds in the physical environment (e.g., there is a ticking analog clock in the user's physical environment), session length parameters (e.g., the target length of the guided meditation session is five minutes), contextual information (e.g., the user is located in their home, it is 8:00 A.M., and the user has a work meeting at 9:00 A.M.), and sensor data (e.g., the user's real time heart rate data). Head-mounted device 10 thereafter wirelessly receives audio information and visual information for the guided meditation session (generated by the trained model). The audio information includes verbal instructions to listen to the ticking clock, look at the bouquet of flowers, look at a specific flower in the bouquet of flowers, look at a specific portion of a single flower in the bouquet of flowers, pick up the bouquet of flowers, rotate the bouquet of flowers, etc. During the operations of block 116, head-mounted device 10 presents the guided meditation session using speaker 34.

As a second example, a user may, during the operations of block 102, provide touch input to their cellular telephone. The touch input may include a request for a 25-35 minute guided meditation session that incorporates a physical object from their physical environment. The user input provided to the cellular telephone may be wireless communicated to head-mounted device 10. During the operations of block 104, head-mounted device 10 may determine that an intent based on the user input represents an intent to provide guided meditation. During the operations of block 106, the power consumption of one or more cameras 36 in head-mounted device 10 is increased (e.g., the cameras are turned on or a sampling rate of the cameras is increased) and the cameras capture one or more images of a physical environment of the user. During the operations of block 108, control circuitry 14 in head-mounted device 10 may identify an object that satisfies a reflectivity criterion (e.g., a glass of water) in the physical environment based on the one or more images captured by cameras 36. The operations of blocks 110, 112, and 114 may be omitted in this example.

In the second example, head-mounted device 10 stores trained model 62 in control circuitry 14. Control circuitry 14 may provide various inputs to the trained model such as information regarding one or more images of the physical environment (e.g., there is a glass of water in the user's physical environment), session length parameters (e.g., the minimum length of the guided meditation session is 25 minutes and the maximum length of the guided meditation session is 35 minutes), contextual information (e.g., the user is at a public park and recently finished a full day work meeting), and sensor data (e.g., the user's real time heart rate data). Trained model 62 subsequently generates audio information and visual information for the guided meditation. The audio information includes verbal instructions to look at the glass of water, pick up the glass of water, rotate the glass of water, etc. During the operations of block 116, head-mounted device 10 presents the guided meditation session using speaker 34.

As a third example, a user may, during the operations of block 102, perform a gaze gesture. During the operations of block 104, head-mounted device 10 may determine that an intent based on the gaze gesture represents an intent to provide guided meditation based on background noises in the user's physical environment. The operations of blocks 106 and 108 may be omitted in this example. During the operations of block 110, the power consumption of one or more microphones in head-mounted device 10 is increased (e.g., the microphones are turned on or a sampling rate of the microphones is increased) and the microphones capture one or more sounds of a physical environment of the user. During the operations of block 112, control circuitry 14 in head-mounted device 10 may identify bird chirps based on the audio captured by the microphones. During the operations of block 114, display 32 may present a virtual object that is associated with the guided meditation session.

In the third example, head-mounted device 10 has multiple guided meditation sessions stored in control circuitry 14. Head-mounted device 10 may select one of the multiple stored guided meditation sessions based at least on the detected noise of bird chirps. During the operations of block 116, head-mounted device 10 may present the selected one of the multiple stored guided meditation sessions. The selected guided meditation session may include display 32 presenting a virtual reality environment. As an example, display 32 may present a virtual reality environment that includes a forest (e.g., a setting associated with the identified sound of bird chirps). The guided meditation session may include audible instructions to listen to the bird chirps. The guided meditation session may also include audible instructions to look at the virtual object presented during the operations of block 114, to look at various portions of the virtual reality environment, etc.

FIG. 4 is a flowchart showing an illustrative method for operating a head-mounted device during an interactive guided meditation session. During the operations of bock 122, head-mounted device 10 may, during a first portion of a guided meditation session, present a reference to a physical object in the user's physical environment. As a specific example, speaker 34 may present an instruction to the user to look at the physical object.

Next, during the operations of bock 124, head-mounted device 10 may, while in the first portion of the guided meditation session, present an instruction for the user to interact with the physical object referenced during the operations of block 122. As a specific example, speaker 34 may present an instruction to the user to pick up the physical object.

During the operations of block 126, after presenting the instruction during the operations of block 124, head-mounted device 10 may increase the power consumption of one or more sensors. The one or more sensors may be turned on (or may have a sampling rate increased during the operations of block 126). The one or more sensors that are turned on may include sensors that are capable of detecting (alone or in combination) the user interaction with the physical object. For example, one or more cameras 36 may be turned on (or may have a sampling rate increased) at block 126 to detect the user interacting with the object. Gaze tracking sensor 40 and/or depth sensor 42 may be turned on (or may have a sampling rate increased) at block 126 to detect the user interacting with the object.

The example of increasing the power consumption of one or more sensors during the operations of block 126 is merely illustrative. In some situations, the user interaction may be detected without increasing the power consumption of one or more sensors and the operations of block 126 may be omitted.

During the operations of block 128, head-mounted device 10 may detect the user interaction (as instructed during the operations of block 124) using the one or more sensors from the operations of block 126.

During the operations of block 130, head-mounted device 10 may, in response to detecting the user interaction with the physical object during the operations of block 128, advance the guided meditation session from the first portion to a second portion. As examples, the first portion of the guided meditation session may include verbal instructions focused on looking at (without touching) the physical object whereas the first portion of the guided meditation session may include verbal instructions focused on physically holding the physical object.

Head-mounted device 10 may present a notification identifying the transition from the first portion of the guided meditation session to the second portion of the guided meditation session. The notification may include an audible notification (e.g., a chime) presented by speaker 34, a haptic notification presented by haptic output device 44, a visual notification presented by display 32, etc.

The power consumption of the one or more sensors may be changed multiple times before and/or during the guided meditation session. For example, camera(s) 36 may be turned on for the detection of a physical object (e.g., before the operations of block 122). After detecting the physical object, the camera(s) 36 may be turned off. Then, the camera(s) may be turned on during the operations of block 126. After the interaction is detected during the operations of block 128, the camera(s) 36 may be turned off. One or more sensors may be turned on and off (or have their sampling rates increased and decreased) at various times of the guided meditation session to identify triggers for transitions between different portions of the guided meditation session.

As an example, head-mounted device 10 may detect a physical object that is suitable for a guided meditation session. Trained model 62 may generate a guided meditation session with multiple portions associated with the physical object. During a first portion, the guided meditation session may provide instructions associated with looking at the physical object. During a second portion, the guided meditation session may provide instructions associated with holding and/or rotating the physical object. During a third portion, the guided meditation session may provide instructions associated with feeling the physical object. During the operations of block 122, head-mounted device 10 may present a reference to the physical object (e.g., an audible instruction to look at the physical object). Then, during the operations of block 124, head-mounted device may present an instruction for the user to pick up and rotate the physical object. After presenting the instruction for the user to pick up and rotate the physical object, the power consumption of camera(s) 36 is increased during the operations of block 126. During the operations of block 128, the one or more cameras are used to detect the user picking up and rotating the physical object. Detecting this interaction serves as a trigger for the guided meditation session to advance from the first portion to the second portion. During the operations of block 130, head-mounted device 10 may advance the guided meditation session from the first portion to the second portion in response to detecting the user picking up and rotating the physical object. After the operations of block 130, additional instructions associated with the second portion of the guided meditation session may be provided. Also during the operations of block 130, the power consumption of camera(s) 36 may be decreased (until the guided meditation session provides another instruction associated with transitioning from the second portion to the third portion).

The order of operations presented in FIGS. 3 and 4 are merely illustrative and the operations may be performed in any desired order. One or more operations may also be omitted if desired.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device comprising:
one or more cameras;
one or more speakers;
one or more processors; and
memory storing instructions configured to be executed by the one or more processors, the instructions for:
    obtaining a user input;
    determining an intent based on the user input; and
    in accordance with a determination that the intent represents an intent to provide guided meditation:
        capturing one or more images of a physical environment using the one or more cameras;
        identifying at least one physical object in the physical environment based on the one or more images; and
        presenting a guided meditation session using the one more speakers, wherein the guided meditation session references the at least one physical object in the physical environment.

2. The electronic device defined in claim 1, further comprising:

one or more sensors, wherein obtaining the user input comprises obtaining the user input using the one or more sensors and wherein the one or more sensors comprises a microphone, a touch sensor, a button, or an accelerometer.

3. The electronic device defined in claim 1, wherein obtaining the user input comprises wirelessly receiving user input information from an external electronic device, wherein the external electronic device is a tablet computer, a laptop computer, a cellular telephone, or a watch.

4. The electronic device defined in claim 1, wherein identifying the at least one physical object in the physical environment based on the one or more images comprises providing information regarding the one or more images of the physical environment to a trained model, wherein the guided meditation session is generated by the trained model, and wherein providing the information regarding the one or more images of the physical environment to the trained model comprises providing the one or more images of the physical environment to the trained model.

5. The electronic device defined in claim 1, wherein the guided meditation session is based on one or more session length parameters and contextual information and wherein the contextual information comprises location information, cultural information, age information, user preference information, temporal information, or calendar information.

6. The electronic device defined in claim 1, further comprising:
one or more microphones, wherein the instructions further comprise instructions for, in accordance with the determination that the intent represents the intent to provide guided meditation:
    capturing one or more sounds in the physical environment using the one or more microphones, wherein the guided meditation session references at least one of the one or more sounds in the physical environment.

7. The electronic device defined in claim 1, wherein the at least one physical object in the physical environment satisfies a reflectivity criterion.

8. The electronic device defined in claim 1, wherein the instructions further comprise instructions for:
while presenting a first portion of the guided meditation session:
    detecting, using the one or more cameras, a user interaction with the at least one physical object in the physical environment; and
in accordance with detecting the user interaction with the at least one physical object in the physical environment, advancing the guided meditation session from the first portion to a second portion.

9. The electronic device defined in claim 1, further comprising:
one or more displays, wherein the instructions further comprise instructions for:
    presenting, using the one or more displays, a virtual object, wherein the guided meditation session references the virtual object.

10. A method of operating an electronic device comprising one or more cameras and one or more speakers, the method comprising:
obtaining a user input;
determining an intent based on the user input; and
in accordance with a determination that the intent represents an intent to provide guided meditation:
    capturing one or more images of a physical environment using the one or more cameras;

identifying at least one physical object in the physical environment based on the one or more images; and presenting a guided meditation session using the one more speakers, wherein the guided meditation session references the at least one physical object in the physical environment.

11. The method defined in claim 10, wherein the electronic device further comprises one or more sensors, wherein obtaining the user input comprises obtaining the user input using the one or more sensors, and wherein the one or more sensors comprises a microphone, a touch sensor, a button, or an accelerometer.

12. The method defined in claim 10, wherein obtaining the user input comprises wirelessly receiving user input information from an external electronic device and wherein the external electronic device is a tablet computer, a laptop computer, a cellular telephone, or a watch.

13. The method defined in claim 10, wherein identifying the at least one physical object in the physical environment based on the one or more images comprises providing information regarding the one or more images of the physical environment to a trained model, wherein the guided meditation session is generated by the trained model, and wherein providing the information regarding the one or more images of the physical environment to the trained model comprises providing the one or more images of the physical environment to the trained model.

14. The method defined in claim 10, wherein the guided meditation session is based on one or more session length parameters and contextual information and wherein the contextual information comprises location information, cultural information, age information, user preference information, temporal information, or calendar information.

15. The method defined in claim 10, wherein the electronic device further comprises one or more microphones and wherein the method further comprises, in accordance with the determination that the intent represents the intent to provide guided meditation:

capturing one or more sounds in the physical environment using the one or more microphones, wherein the guided meditation session references at least one of the one or more sounds in the physical environment.

16. The method defined in claim 10, wherein the at least one physical object in the physical environment satisfies a reflectivity criterion.

17. The method defined in claim 10, further comprising:

while presenting a first portion of the guided meditation session:

detecting, using the one or more cameras, a user interaction with the at least one physical object in the physical environment; and in accordance with detecting the user interaction with the at least one physical object in the physical environment, advancing the guided meditation session from the first portion to a second portion.

18. The method defined in claim 10, wherein the electronic device further comprises one or more displays and wherein the method further comprises:

presenting, using the one or more displays, a virtual object, wherein the guided meditation session references the virtual object.

19. A non-transitory computer-readable storage medium storing one or more programs configured to be executed by one or more processors of an electronic device comprising one or more cameras and one or more speakers, the one or more programs including instructions for:

obtaining a user input;

determining an intent based on the user input; and in accordance with a determination that the intent represents an intent to provide guided meditation:

capturing one or more images of a physical environment using the one or more cameras;

identifying at least one physical object in the physical environment based on the one or more images; and presenting a guided meditation session using the one more speakers, wherein the guided meditation session references the at least one physical object in the physical environment.

20. The non-transitory computer-readable storage medium defined in claim 19, wherein the electronic device further comprises one or more sensors, wherein obtaining the user input comprises obtaining the user input using the one or more sensors, and wherein the one or more sensors comprises a microphone, a touch sensor, a button, or an accelerometer.

21. The non-transitory computer-readable storage medium defined in claim 19, wherein obtaining the user input comprises wirelessly receiving user input information from an external electronic device and wherein the external electronic device is a tablet computer, a laptop computer, a cellular telephone, or a watch.

22. The non-transitory computer-readable storage medium defined in claim 19, wherein identifying the at least one physical object in the physical environment based on the one or more images comprises providing information regarding the one or more images of the physical environment to a trained model, wherein the guided meditation session is generated by the trained model, and wherein providing the information regarding the one or more images of the physical environment to the trained model comprises providing the one or more images of the physical environment to the trained model.

23. The non-transitory computer-readable storage medium defined in claim 19, wherein the guided meditation session is based on one or more session length parameters and contextual information and wherein the contextual information comprises location information, cultural information, age information, user preference information, temporal information, or calendar information.

24. The non-transitory computer-readable storage medium defined in claim 19, wherein the electronic device further comprises one or more microphones and wherein the instructions further comprise instructions for, in accordance with the determination that the intent represents the intent to provide guided meditation:

capturing one or more sounds in the physical environment using the one or more microphones, wherein the guided meditation session references at least one of the one or more sounds in the physical environment.

25. The non-transitory computer-readable storage medium defined in claim 19, wherein the at least one physical object in the physical environment satisfies a reflectivity criterion.

26. The non-transitory computer-readable storage medium defined in claim 19, wherein the instructions further comprise instructions for:

while presenting a first portion of the guided meditation session:

detecting, using the one or more cameras, a user interaction with the at least one physical object in the physical environment; and in accordance with detecting the user interaction with the at least one physical object in the physical environment, advancing the guided meditation session from the first portion to a second portion.

27. The non-transitory computer-readable storage medium defined in claim 19, wherein the electronic device further comprises one or more displays and wherein the instructions further comprise instructions for:

presenting, using the one or more displays, a virtual object, wherein the guided meditation session references the virtual object.

* * * * *